Patented Mar. 29, 1949

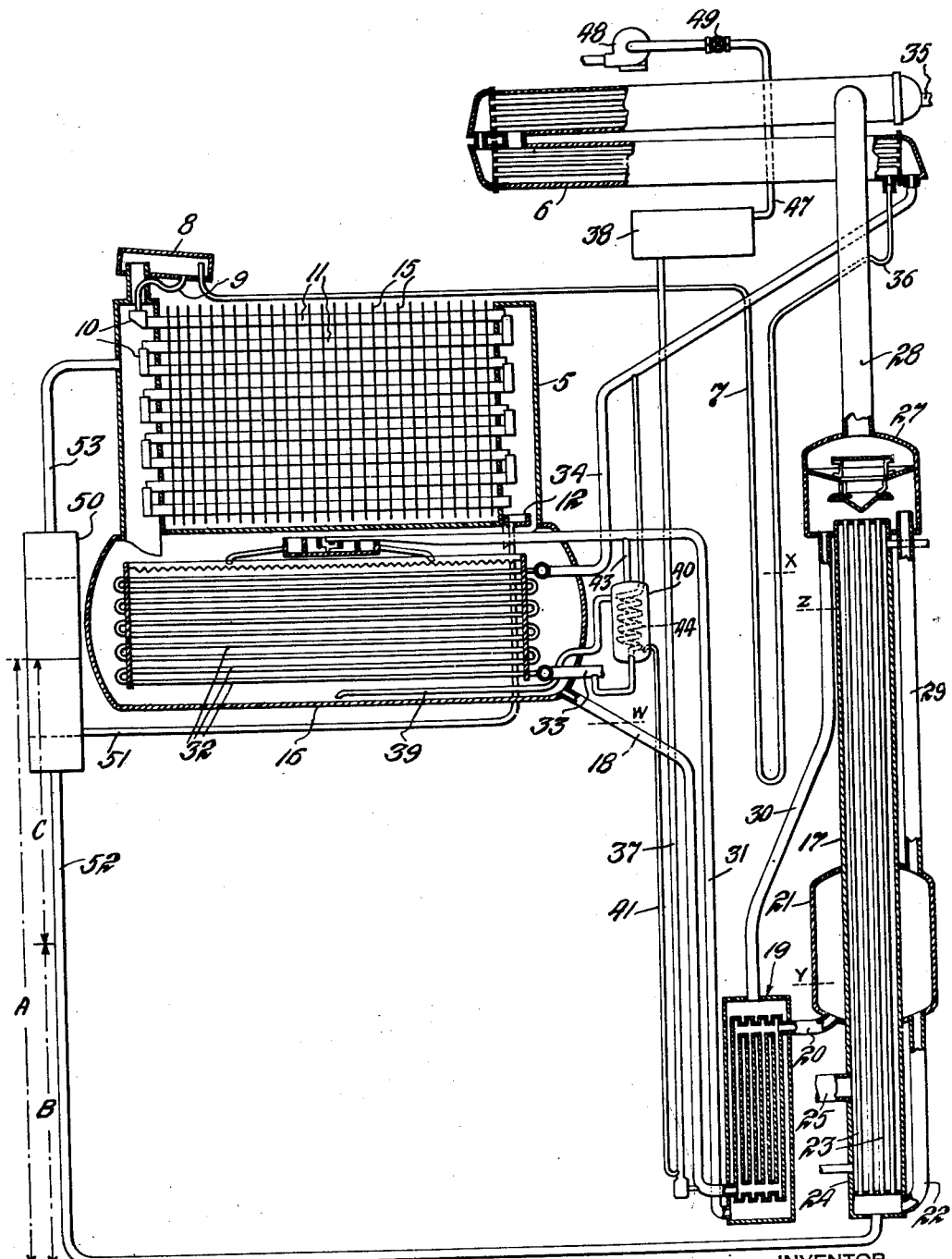

2,465,904

UNITED STATES PATENT OFFICE 2,465,904

ABSORPTION REFRIGERATION APPARATUS AND METHOD INCLUDING ABSORPTION LIQUID CONCENTRATION CONTROL

Lowell McNeely, Evansville, Ind., assignor to Servel, Inc., New York, N. Y., a corporation of Delaware Application June 10, 1944, Serial No. 539,620

16 Claims. (Cl. 62—119)

The present invention relates to absorption refrigeration systems and more particularly to a method of and apparatus for varying the concentration of the absorption solution in such systems.

While the method and apparatus of the present invention may be used in other absorption refrigeration units, it is particularly adapted for use in a unit of the type illustrated and described in the United States Letters Patent issued to Albert R. Thomas et al., No. 2,282,503, entitled Refrigeration. The absorption refrigeration unit illustrated in the Thomas et al. patent operates in a partial vacuum and utilizes water as a refrigerant and a saline solution as an absorbent.

Such refrigeration units may be used for refrigerating any medium and have been used quite extensively in air conditioning systems to cool the air delivered to an enclosure. If the unit is initially charged with saline solution at maximum concentration for particular operating conditions, a change in operating conditions may cause freezing of the refrigerant, water, in the evaporator, the blowing out of liquid refrigerant from the evaporator tubes due to rapid evaporation, superheating of the absorption solution in the generator or crystallization and precipitation of salt from the solution. The changes in operating conditions may be caused by a decrease in the cooling water temperature, the presence of noncondensible gases in the absorber, particular load variations, or the like. Such changes in operating conditions also will cause a decrease in the difference in pressure between the high and low pressure sides of the unit.

On the other hand, if the unit is initially charged with an excessively dilute solution of the saline absorbent, the refrigerant will not freeze in the evaporator nor be blown from the tubes thereof and superheating in the generator and crystallization and precipitation of salt from the solution will be avoided. However, with such a dilute absorption solution the unit will not produce an evaporator temperature suitable for air conditioning at higher cooling water temperatures or when non-condensible gases are present in the absorber. As the cooling water temperature increases or the amount of non-condensible gases in the absorber decreases, the difference in pressure between the high and low pressure sides of the unit increases.

It has been the practice to initially charge the units with a saline solution of such concentration as to produce the best results for average cooling water temperatures and nominal amounts of non-condensible gas to adapt the unit for use in any locality, but the unit will not have optimum operating characteristics with cooling water at high or low temperatures.

One of the objects of the present invention is to provide a method of and apparatus for varying the concentration of the absorption solution in an absorption refrigeration unit in accordance with variations in operating conditions to maintain the refrigeration capacity and operating characteristics of the unit more uniform under all operating conditions.

Another object is to provide a method of and apparatus for varying the concentration of the absorption solution in accordance with variations in the temperature of the cooling water used with the unit.

Another object is to provide a method of and apparatus for varying the concentration of the absorption solution in accordance with variations in the difference in pressure between the high and low pressure sides of the unit.

Another object of the invention is to provide a storage vessel connected to receive and store liquid refrigerant when the difference in pressure between the high and low pressure sides of the unit increases to increase the concentration of the absorption solution and to deliver the stored refrigerant when the difference in pressure decreases to dilute the solution.

Still another object of the invention is to generally improve the operating charactertistics of a two-pressure absorption refrigeration system which operates in a partial vacuum.

These and other objects will become more apparent from the following description and drawing. It is to be understood, however, that the drawing is for the purpose of illustration only and not a definition of the limits of the invention, reference being had for this purpose to the appended claims.

The drawing illustrates a diagrammatic view of an absorption refrigeration unit incorporating the novel features of the present invention and showing the storage vessel connected between the evaporator and generator.

In accordance with the method of the present invention, the absorption refrigeration unit is initially charged with saline solution sufficiently diluted so as to produce a rated capacity for low cooling water temperatures without blowing refrigerant out of the evaporator tubes. When the difference in pressure between the high and low pressure sides of the unit increases due to a changed condition such as an increase in the cooling water temperature, the purging of noncondensible gases from the absorber, a decrease in air temperature or the like, unevaporated liquid refrigerant in quantities proportional to the increase in the pressure differential is diverted and stored outside the active part of the system in a storage vessel connected between the evaporator and generator. The diversion and storage of liquid refrigerant progressively increases the concentration of the absorption solution circulating in the system which, in turn, tends to decrease the pressure and temperature in the evaporator to compensate for the changed condition which tends to increase the evaporator pressure and temperature and thereby maintain the refrigeration capacity and efficiency of the unit more uniform under varying conditions of operation.

The system will continue to operate at the same evaporator pressure and temperature until another change occurs in the operating conditions. Upon a decrease in the difference in pressure between the high and low pressure sides of the system due to a decrease in the cooling water temperature, the presence of non-condensible gases in the absorber, an increase in the air temperature or the like, the liquid refrigerant in the storage vessel is delivered to the generator in amounts proportional to the decrease in the pressure differential to progressively dilute the absorption solution. The diluted absorption solution will tend to increase the temperature and pressure in the absorber and evaporator to compensate for the changed condition which tends to decrease the evaporator pressure and temperature and thereby prevent freezing of refrigerant in the evaporator, blowing out of liquid refrigerant from the evaporator tubes, superheating of the absorption solution in the generator or crystallization and precipitation of salt from the solution.

Preferably the storing of liquid refrigerant in the storage vessel and the delivery of the stored refrigerant to the generator is performed automatically by utilizing variations in the pressure differential between the high and low pressure sides of the system due to the changes in operating conditions occurring in the system. The pressure differential between the high and low pressure sides of the system is the difference in vapor pressure of the refrigerant at the condensing temperature in the condenser and its vapor pressure in the absorbent at the absorbing temperature in the absorber; and the pressure differential increases or decreases with changes in operating conditions such as the temperature of the cooling water supplied to the condenser and absorber. Thus, the method of the present invention provides for automatically concentrating and diluting the saline absorption solution in direct proportion to changes in operating conditions occurring in the unit to maintain an optimum evaporating temperature for any particular condition prevailing in the unit.

Referring to the drawing the present invention is shown applied to an absorption refrigeration system generally similar to that illustrated in the Thomas et al. patent, referred to above, comprising a cooling element or evaporator 5 into which liquid refrigerant, such as, for example, water is introduced from a condenser 6 through a path of flow including a U-shaped tube 7 and flash chamber 8. The liquid refrigerant flows from the flash chamber 8 through a tube 9 into a distributing trough 10 which directs it for successive flow through the plurality of generally horizontal tubes 11. Each of the tubes 11 is inclined slightly so that the liquid refrigerant will flow therethrough by gravity and the liquid refrigerant discharged from the end of the tube is directed by another trough 10 into the next horizontal tube 11 or from the end tube of a horizontal row to the end tube of the next lowermost row of a bank of such tubes. Thus, the cooling element or evaporator 5 is made up of a series of tubes 11 and distributing troughs 10 arranged in series to provide a tortuous path of flow for the refrigerant to promote evaporation as it passes through the evaporator.

The number and surface area of the tubes 11 is so proportioned as to cause complete evaporation of a quantity of liquid refrigerant required for a certain load under a certain set of operating conditions during operation of the system. Underlying the end of the lowermost tube 11 of the bank of tubes is a drain trough 12 for receiving unevaporated liquid refrigerant when it passes from the bottom of the evaporator as, for instance, upon an increase in pressure difference in the unit when the cooling water temperature increases. The liquid refrigerant is thus evaporated in the evaporator 5 with consequent absorption of heat from the ambient such as a stream of air flowing over the exterior surface of the tubes 11 and heat transfer fins 15 connecting the tubes. The refrigerant vapor formed in the evaporator 5 flows to an absorber 16 in which the vapor is absorbed into a liquid absorbent such as, for example, a solution of lithium chloride, lithium bromide, or the like.

The absorption liquid enriched with refrigerant is conducted from the absorber 16 to a generator 17 in a path of flow including a conduit 18, liquid heat exchanger 19, conduit 20, vessel 21, and conduit 22. Within the generator 17 a plurality of riser tubes 23 are enclosed within a shell 24 to form a chamber to which steam is supplied from a suitable source through a conduit 25. The heating of the riser tubes 23 by the steam causes refrigerant vapor to be expelled from the absorption solution and the expelled vapor is effective to raise the absorption liquid by gas or vapor-lift action.

The expelled vapor passes from the upper ends of the riser tubes 23 into a vapor separating chamber 27 having suitable baffles therein and thence flows through a conduit 28 to the condenser 6 where the vapor is liquefied. The liquid refrigerant formed in the condenser 6 flows by gravity into the U-shaped tube 7 to the upper part of the evaporator 5 as explained above to complete the refrigeration cycle. Preferably a conduit 29 connects the chamber 21 and vapor separating chamber 27 to equalize the pressure therebetween.

The raised absorption liquid from which refrigerant vapor has been expelled is conducted from the separating chamber 27 at the upper end of the generator 17 to the absorber 16 to absorb refrigerant vapor, this liquid being conducted to the absorber in a path of flow including a conduit 30, liquid heat exchanger 19 and conduit 31. The heat liberated by the absorption of refrigerant vapor in the absorber 16 is taken up by a cooling medium such as, for example, water which flows upwardly through vertically disposed banks of pipes 32 in the absorber. The cooling water is introduced into the lower ends of the banks of pipes through a conduit 33 and is discharged from the upper ends of the banks of pipes through a conduit 34. The conduit 34 is connected to the condenser 6 so that the cooling water also may be utilized to effect cooling of the condenser. The cooling water is discharged from the condenser 6 through a conduit 35.

The system operates in a partial vacuum with generator 17 and condenser 6 operating at one pressure and evaporator 5 and absorber 16 operating at a lower pressure. The pressure differential between the high and low pressure sides of the system is maintained by liquid columns in the up-leg of the U-shaped tube 7 between the condenser 6 and the evaporator 5 and in the conduits 18 and 31 connecting the absorber 16 and heat exchanger 19. The liquid level in the U-shaped tube 7 is indicated by the reference character $x$, the liquid levels in vessel 21 and conduit 18 connected thereto through the heat exchanger 19 are indicated by the reference characters $y$ and $w$, and the liquid level in the conduit 30 connected to the conduit 31 through the heat exchanger 19 is indicated by the reference character $z$.

During the operation of the refrigeration system non-condensible gases may occur in the various elements thereof which are segregated from the active parts of the system and purged periodically from the system to the atmosphere. Any non-condensible gases in the generator 17 are swept into the condenser 6 with the refrigerant vapor flowing thereto and the gases accumulate adjacent the outlet therefrom. A liquid syphon pump 36 in the down leg of the U-shaped tube 7 operates continuously to transfer the non-condensible gases from the condenser 6 to the evaporator 5. Any gases in the evaporator 5 are immediately swept into the absorber 16 with the refrigerant vapor flowing thereto and the gases accumulate at the bottom and center of the absorber where turbulence is at a minimum.

A riser tube 37 has its lower end connected to the conduit 18 adjacent the heat exchanger 19 and its upper end connected to a storage container 38 for receiving and storing non-condensible gases. The non-condensible gases are continuously transferred from the absorber 16 to the storage container 38 through a conduit 39, auxiliary absorber 40, fall tube pump 41, and riser tube 37, in the manner illustrated and described in U. S. Letters Patent of Charles Alfred Roswell, No. 2,384,861, issued September 18, 1945, and entitled Refrigeration. Absorption liquid is diverted from the conduit 31 to the auxiliary absorber 40 through a conduit 43. The absorption liquid periodically syphons into the fall tube pump 41 and traps non-condensible gases between successive slugs of liquid. A cooling coil 44 in the auxiliary absorber 40 is connected between the water main 33 and conduit 34 to circulate cooling water therethrough to absorb the heat of absorption. The column of liquid slugs and non-condensible gases in the fall tube 41 maintains the pressure differential between the high and low pressure sides of the system and the liquid and gas are discharged into the lower end of the riser tube 37. The non-condensible gases bubble upwardly through the liquid in the riser tube 37 and enter the storage container 38. The absorption liquid flows through the lower end of the riser tube into the conduit 18. The non-condensible gases are purged from the storage container 38 through a conduit 47 having one end connected to the container and its opposite end connected to a suitable exhaust pump 48. Preferably a control valve 49 is provided in conduit 47 for preventing the atmosphere from entering the refrigeration system when the pump is inoperative.

In accordance with the present invention the concentration of the absorption solution is controlled automatically in accordance with variations in the pressure differential between the evaporator 5 and generator 17. For this purpose a storage vessel 50 is connected to the drain trough 12 in the evaporator 5 by means of a conduit 51. Conduit 51 extends from the drain trough 12 outwardly through the absorber 16 with its end connected to the side of the storage vessel 50 intermediate the ends of the latter. A conduit 52 connects the bottom of the storage vessel 50 to the bottom of the generator 17. The storage vessel 50 is located at a suitable height above the bottom of the generator 17 so as to maintain a liquid column of a height A in the conduit 52 and vessel 50 equal to the sum of the liquid column B corresponding to the height of the liquid level Y in the generator and the column C corresponding to the difference in pressure between the evaporator and generator. A vent tube 53 also connects the top of the storage vessel 50 to the vapor space in the evaporator 5 to subject the surface of the liquid in the storage vessel to the pressure in the evaporator.

When the difference in pressure between the evaporator 5 and generator 17 increases to a maximum value the height of the column A will have a corresponding increase whereby to increase the effective volume for liquid storage in the vessel 50 to the liquid level indicated by the upper dash line. Upon a decrease in the difference in pressure between the evaporator 5 and generator 17 to a minimum value the height of the column A will decrease and thereby decrease the amount of liquid refrigerant in the storage vessel 50 and also the effective liquid holding volume of the latter to the level indicated by the lower dash line. The effective volume for holding liquid refrigerant in the storage vessel 50, therefore, will vary directly in proportion to the difference in pressure between the high and low pressure sides of the system to some value between the upper and lower limits as indicated by the full line in the drawing. The storage vessel 50 is illustrated in the drawing as having a cylindrical shape to adapt it to store equal amounts of refrigerant for equal increments of pressure variation but it will be understood that the vessel may be made larger or smaller or may have other shapes to change the effective storage volume by continuously varying amounts for equal increments of pressure variation to provide for the particular conditions of application. A preferred embodiment of the invention having now been described in detail the mode of operation of the apparatus is explained as follows:

For purposes of description let it be assumed that the refrigeration unit is about to be started after an off cycle phase, at which time the pressure differential between the evaporator 5 and generator 17 will be at a minimum and the liquid in the column formed by the storage vessel 50 and conduit 52 will stand at the same level as the level of the solution in the stabilizing vessel 21 to dilute the absorption solution in the generator 17. Upon the introduction of steam to the generator 17 through the conduit 25 refrigerant vapor will be expelled without difficulty, usually encountered from superheating in the generator, due to the dilution of the solution. Refrigerant vapor expelled from generator 17 will be conducted to the condenser 6 where it will be condensed and thence will flow through the U-shaped tube 7 and flash chamber 8 to the evaporator 5. The liquid refrigerant supplied to the evaporator 5 will be evaporated by heat transferred thereto from the ambient. Refrigerant vapor evaporated in evaporator 5 will be absorbed in the absorption solution in the absorber 16 and the dilute solution will flow through the conduit 18, heat exchanger 19, conduit 20, vessel 21, and conduit 22 back to the generator 17.

If the cooling water supplied to the absorber 16 is relatively cold the difference in pressure between the high and low pressure sides of the system will be small due to the relationship of the vapor pressures of the water used as a refrigerant and the saline solution used as an absorbent. In other words, the difference in pressure between the high and low pressure sides of the system increases with increases in the temperature of the cooling water supplied to the absorber 16 and decreases with decreases in the temperature of the cooling water.

As an example, the following table shows the relationship of the difference in pressure between the high and low pressure sides of the system for cooling water supplied to the absorber at different temperatures.

*Inlet cooling water to absorber*

|  | 70° F. | 80° F. | 90° F. |
|---|---|---|---|
| Absorber: | | | |
| 1. Outlet temp | 82° F | 92° F | 102° F. |
| 2. Absorber temp | 80° F | 90° F | 100° F. |
| 3. Absorber press | 7.5 mm. Hg | 9.0 mm. Hg | 10.5 mm. Hg. |
| Condenser: | | | |
| 1. Inlet temp | 82° F | 92° F | 102° F. |
| 2. Outlet temp | 92° F | 102° F | 112° F. |
| 3. Condenser temp | 91° F | 101° F | 111° F. |
| 4. Condenser press | 36 mm. Hg | 50 mm. Hg | 67.5 mm. Hg. |
| Difference in press. between condenser and absorber | 28.5 mm. Hg | 41 mm. Hg | 57 mm. Hg. |

Thus, with relatively cold cooling water supplied to the absorber 16 the small difference in pressure between the high and low pressure sides of the system will limit the height of the liquid column A in the storage vessel 50 and the amount of refrigerant that can be stored therein to maintain a relatively dilute absorption solution. The relatively dilute absorption solution then supplied to the absorber will compensate for the low cooling water temperature to maintain a vapor pressure in the absorber that will prevent the temperature in the evaporator 5 from decreasing to a value which would cause the blowing of liquid refrigerant from the tubes 11 of the evaporator 5 due to rapid evaporation or freezing of the refrigerant in the evaporator.

On the other hand, if relatively warm cooling water is supplied to the absorber 16 or the temperature of the cooling water in a particular unit increases with a change of seasons or a change in atmospheric conditions when a cooling tower is used, the difference in pressure between the high and low pressure sides of the system increases. Such an increase in the temperature of the cooling water supplied to the absorber increases the temperature of absorption which decreases the rate of evaporation of liquid refrigerant in the evaporator so that unevaporated liquid refrigerant overflows into the drain trough 34 whereby the storage vessel 50 will gradually fill up with liquid refrigerant which spills over in the evaporator 5. Such liquid refrigerant will be collected in the drain trough 12 and conveyed through the conduit 51 to the storage vessel 50. The diversion and storage of liquid refrigerant will increase the concentration of the absorption solution to produce a sufficiently low temperature in the evaporator 5 to evaporate all of the liquid refrigerant supplied thereto and thereby compensate for the increase in the cooling water temperature to maintain the capacity of the unit more uniform for the varying operating conditions. Thus the relatively concentrated absorption solution will produce an evaporator temperature sufficiently low to adapt it for use in an air conditioning system even when cooling water at a relatively high temperature is supplied to the absorber 16. In other words, the present apparatus operates automatically to vary the concentration of the absorption solution in accordance with variations in the temperature of the cooling water supplied to the absorber to maintain the evaporator temperature within predetermined limits to prevent freezing or blowing out of refrigerant on the one hand and to provide effective cooling on the other hand.

While the operation of the unit has been described to maintain optimum operating characteristics when cooling water is supplied at varying temperatures, it will be understood that the concentration of the solution will be changed by any condition in the system which varies the difference in pressure between the high and low pressure sides of the system. For instance, the presence of non-condensible gases in the absorber 16 tends to cause crystallization and precipitation of salt from the absorption solution because of blocked absorption surfaces which progressively increase the concentration of the solution supplied to the generator. The occurrence of such gases in the absorber might result from failure to purge non-condensible gases from the storage vessel 38 when the latter is filled so that additional gases generated in the system will circulate therein. The presence of such non-condensible gases will cause an increase in the pressure in the absorber 16 which, in turn, will deliver liquid refrigerant from the storage vessel 50 to the generator 17 to dilute the absorption solution to compensate for the effect of the non-condensible gases. Under certain load conditions the diversion and storage of liquid refrigerant to increase concentration of the absorption solution operates advantageously to obtain low temperatures at light loads. In other words, the apparatus of the present invention is operative automatically to vary the concentration of the absorption solution directly in proportion to variations in the difference in pressure between the low pressure and high pressure sides of the system.

It will now be observed from the foregoing specification that the present invention provides a method of and apparatus for varying the concentration of the absorption solution in accordance with varying conditions in the system such as the cooling water temperature. It will also be observed that the present invention provides for varying the concentration of the absorption solution automatically in accordance with variations in the difference in pressure between the high and low pressure sides of the unit. It will still further be observed that the apparatus for controlling the concentration of the absorption solution is of simple and compact construction to adapt it for economical manufacture and that the size and shape of the storage vessel may be varied to produce any desired variation in the ratio of the concentration of the absorption solution to increments of variation in the pressure between the high and low pressure sides of the system.

While the method and a preferred apparatus has been illustrated and described it is to be understood that variations may be made in the steps of the method and in the form and construction of the apparatus without departing from the spirit or scope of the invention. For example, the present invention is described in the specification as applied to a unit utilizing water as a refrigerant and a saline solution as an absorbent but it is to be understood that the invention may be applied to absorption refrigeration system using other refrigerants and absorbents. The terms "increase the concentration of the absorption solution" and "dilute the absorption solution" as used in the claims, therefore, is intended to include any absorbent which is concentrated by removing refrigerant therefrom and diluted by adding refrigerant thereto. Therefore, without limiting myself in this respect, I claim:

1. The method of regulating the concentration of the absorption solution to compensate for changes in operating conditions in an absorption refrigeration system of the type having a high pressure side and a low pressure side operable at a lower total pressure which comprises utilizing a refrigerant and absorbent which refrigerant in the high pressure side has a vapor pressure greater than its vapor pressure in the absorbent in the low pressure side by a differential which varies in proportion to changes in operating conditions, storing liquid out of absorption solution to increase the concentration of the absorption solution, delivering liquid from storage into circulation in the system to dilute the absorption solution, and varying the storage and delivery of stored liquid in response to variations in said vapor pressure differential whereby to vary the concentration of the absorption solution in accordance with changes in the operating conditions.

2. The method of regulating the concentration of the absorption solution to compensate for changes in operating conditions in a closed absorption refrigeration system of the type having a high pressure side and a low pressure side operable at a lower total pressure which comprises utilizing a refrigerant and absorbent which refrigerant in the high pressure side has a vapor pressure greater than its vapor pressure in the absorbent in the low pressure side by a differential which varies in proportion to changes in operating conditions, storing liquid refrigerant out of absorption solution upon a change in an operating condition in one direction, delivering refrigerant from storage into circulation in the system upon a change in the operating condition in the opposite direction, and varying the storage of refrigerant in response to variations in said vapor pressure differential whereby to vary the concentration of the absorption solution in accordance with changes in operating conditions.

3. The method of regulating the concentration of absorption solution to compensate for changes in operating temperatures in an absorption refrigeration system of the type having a high pressure side and a low pressure side operable at a lower total pressure which comprises utilizing a refrigerant and absorption solution which refrigerant in the high pressure side has a vapor pressure greater than its vapor pressure in the absorbent in the low pressure side by a differential which varies in proportion to operating temperatures, storing refrigerant out of absorption solution to increase the concentration of the absorption solution, delivering refrigerant from storage into circulation in the system to decrease the concentration of the absorption solution, and varying the storage of refrigerant in response to variations in said vapor pressure differential whereby to vary the concentration of the absorption solution in accordance with changes in operating temperatures.

4. The method of regulating the concentration of the absorption solution to compensate for changes in the cooling water temperature in an absorption refrigeration system having a high pressure side and a low pressure side operable at a lower total pressure which comprises storing refrigerant out of absorption solution upon an increase in the temperature of the cooling water supplied to the system to increase the concentration of the absorption solution, delivering stored refrigerant for circulation in the system upon a decrease in the temperature of the cooling water to dilute the absorption solution, and utilizing the increasing or decreasing difference in the vapor pressure of the refrigerant in the high pressure side and in absorption solution in the low pressure side of the system caused by a change in the cooling water temperature to produce a proportional change in the amount of refrigerant stored.

5. The method of regulating the concentration of the absorption solution to compensate for changes in operating conditions in a closed absorption refrigeration system of the type having a high pressure side including a generator and condenser operable at one pressure and a low pressure side including an evaporator and absorber operable at a lower total pressure which comprises circulating refrigerant in a path of flow through the system, storing liquid refrigerant out of its path of flow to increase the concentration of the absorption solution, delivering stored refrigerant to its path of flow in the system to dilute the absorption solution, and controlling the storage of refrigerant in accordance with variations in the difference in pressure between the high and low pressure sides of the system whereby to vary the concentration of the absorption solution in accordance with changes in an operating condition causing a variation in the difference in pressure.

6. The method of regulating the concentration of the absorption solution to compensate for changes in operating conditions in an absorption refrigeration system of the type having a high pressure side including a generator and condenser operable at one pressure and a low pressure side including an evaporator and absorber operable at a lower total pressure which comprises circulating refrigerant in a path of flow through the system, storing liquid refrigerant out of its path of flow upon an increase in the difference in pressure between the two sides of the system to increase the concentration of the absorption solution, and transferring the stored refrigerant to its path of flow in the system upon a decrease in the difference in pressure between the high and low pressure sides of the system to dilute the absorption solution whereby to vary the concentration of the absorption solution in accordance with a change in operating conditions causing an increase or decrease in the pressure differential between the two sides of the system.

7. The method of varying the concentration of the absorption solution in an absorption refrigeration system of the type having a generator and condenser operable at one pressure and an evaporator and absorber operable at a lower total pressure which comprises circulating refrigerant and absorbent in the system, diverting liquid refrigerant from its path of flow and storing it in a liquid column between the evaporator and generator to increase the concentration of the absorption solution, delivering the liquid refrigerant from the liquid column to dilute the absorption solution, and utilizing the increasing or decreasing difference in pressure between the evaporator and generator caused by a change in an operating condition to increase or decrease the height of the liquid column whereby to control the storage or delivery of stored refrigerant in accordance with a change in an operating condition.

8. In an absorption refrigeration system having a high pressure side including a generator and condenser and a low pressure side including an evaporator and absorber operable at a lower total pressure, means for maintaining the pressure differential between the high and low pressure sides of the system, a vessel connected to receive and deliver liquid yet retain a quantity thereof out of action in the system and thereby affect the concentration of the absorbent in the system, and means for varying said quantity of liquid that can be retained in said vessel, and thus vary the concentration of the absorbent, in accordance with the pressure differential between the high and low pressure sides of the system.

9. In an absorption refrigeration system having a generator and condenser operable at one pressure and an evaporator and absorber operable at a lower pressure, means interconnecting the elements to provide a closed circuit for the circulation of refrigerant and absorbent and maintain the pressure differential between the elements, and apparatus for regulating the concentration of absorption solution circulating in the absorbent circuit to compensate for changes in operating conditions comprising refrigerant storage means having its upper end connected to the low pressure side of the system above the liquid level therein and its lower end connected to the absorbent circuit below the liquid level, said refrigerant storage means being connected to receive and store liquid refrigerant out of absorbent liquid and maintain a liquid column to balance the difference in pressure in the system whereby the amount of stored refrigerant varies in accordance with the difference in pressure between the high and low pressure sides of the system.

10. In an absorption refrigeration system a generator and condenser operable at one pressure, an evaporator and absorber operable at a lower total pressure, means interconnecting the elements to provide paths of flow for the circulation of a refrigerant and absorption solution, said last named means maintaining the pressure differential between the condenser and evaporator and the absorber and generator, and a connection between a high pressure element and a low pressure element including a storage vessel for maintaining a liquid column therebetween, of a height corresponding to the difference in pressure said connection being so constructed and arranged as to receive and store liquid refrigerant in the storage vessel to increase the concentration of the absorption solution or to deliver stored refrigerant to dilute the absorption solution, and said connection being responsive to an increase or a decrease in the difference in pressure between the two sides of the system to increase or decrease the height of the liquid column and its capacity to store liquid refrigerant whereby to vary the concentration of the absorption solution in accordance with changes in an operating condition causing variations in the pressure differential.

11. In an absorption refrigeration system having a generator and condenser operable at one pressure and an evaporator and absorber operable at a lower pressure, means interconnecting the elements to provide a closed circuit for the circulation of refrigerant and absorbent and maintain the pressure differential between the elements, a storage vessel connected to receive and store liquid refrigerant overflowing from the evaporator, a conduit connecting the storage vessel to the base of the generator to deliver liquid refrigerant thereto, said conduit and vessel being arranged to maintain a liquid column to balance the difference in pressure between the evaporator and generator whereby the amount of stored refrigerant varies in accordance with variations in the difference in pressure between the evaporator and generator.

12. In an absorption refrigeration system having a generator and condenser operable at one pressure and an evaporator and absorber operable at a lower pressure, means interconnecting the elements to provide a closed circuit for the circulation of refrigerant and absorbent and maintain the pressure differential between the elements, said evaporator having a plurality of tubes arranged to provide a tortuous path of flow and a drain trough to receive liquid refrigerant flowing from the lowermost tube, a storage vessel, a conduit connecting the drain trough in the evaporator to the storage vessel, and a conduit connecting the storage vessel to the base of the generator, said storage vessel being arranged above the base of the generator whereby the storage vessel and conduit maintain a column of liquid refrigerant of a height corresponding to the difference in pressure between the evaporator and generator.

13. In an absorption refrigeration system of the type which operates in a partial vacuum and utilizes water as a refrigerant and a saline solution as an absorbent, a generator, a condenser, an evaporator, an absorber, means interconnecting the elements to provide a closed circuit for the circulation of refrigerant and absorption solution, said last named means maintaining liquid columns between the condenser and evaporator and absorber and generator, and means including a storage vessel connected between the evaporator and generator and adapted to receive liquid refrigerant from the evaporator to maintain a liquid column of a height corresponding to the difference in pressure between the evaporator and generator whereby liquid refrigerant will accumulate and be stored in the storage vessel upon an increase in the pressure differential and will be delivered to the generator upon a decrease in the pressure differential.

14. In an absorption refrigeration system a plurality of elements including a generator interconnected to provide paths of flow for refrigerant and absorbent, means for heating the generator to expel refrigerant from absorbent by boiling, and a vessel in said system and connected to receive liquid refrigerant in the path of flow for refrigerant and connected to deliver refrigerant to the generator, said vessel being so constructed and arranged as to accumulate liquid refrigerant during operation of the system and to deliver the accumulated refrigerant to the generator at the end of a cycle of operation whereby to dilute the absorption solution and promote boiling.

15. In a two pressure absorption refrigeration system having a high pressure side and a low pressure side, a plurality of elements including a generator interconnected to provide paths of flow for refrigerant and absorbent, means for maintaining the difference in pressure between the high and low pressure sides of the system, and a vessel in said system connected to receive liquid refrigerant in the path of flow for refrigerant and connected to deliver liquid refrigerant to the generator, said vessel being so constructed and arranged as to accumulate liquid refrigerant during operation of the system and deliver the accumulated refrigerant to the generator at the end of a cycle of operation to dilute the absorption solution therein and thereby promote boiling of the solution at the start of the next cycle of operation.

16. In an absorption refrigeration system operable in a partial vacuum and utilizing water as a refrigerant and a salt solution as an absorbent, a plurality of elements including a generator interconnected for the circulation of refrigerant and absorbent, means for heating the generator, and a storage vessel connected to receive and store liquid refrigerant during operation of the system and connected to deliver stored refrigerant to the generator at the end of a cycle of operation to dilute the absorption solution therein whereby to promote boiling of the absorption solution.

LOWELL McNEELY.

REFERENCES CITED

The following references are of record in the file of this patent:

UNITED STATES PATENTS

| Number | Name | Date |
|---|---|---|
| 1,615,353 | Altenkirch | Jan. 25, 1927 |
| 1,728,742 | Altenkirch | Sept. 17, 1929 |
| 1,882,253 | Randel | Oct. 11, 1932 |
| 1,922,713 | Randel | Aug. 15, 1933 |
| 1,976,800 | Nesselmann | Oct. 16, 1934 |
| 2,184,726 | Ullstrand | Dec. 26, 1939 |

FOREIGN PATENTS

| Number | Country | Date |
|---|---|---|
| 22,963 | Great Britain | Oct. 17, 1906 |